March 9, 1954　　A. L. FREEDLANDER　　2,671,244
APPARATUS FOR THE MANUFACTURE OF BELTS
Filed June 13, 1949　　2 Sheets-Sheet 2
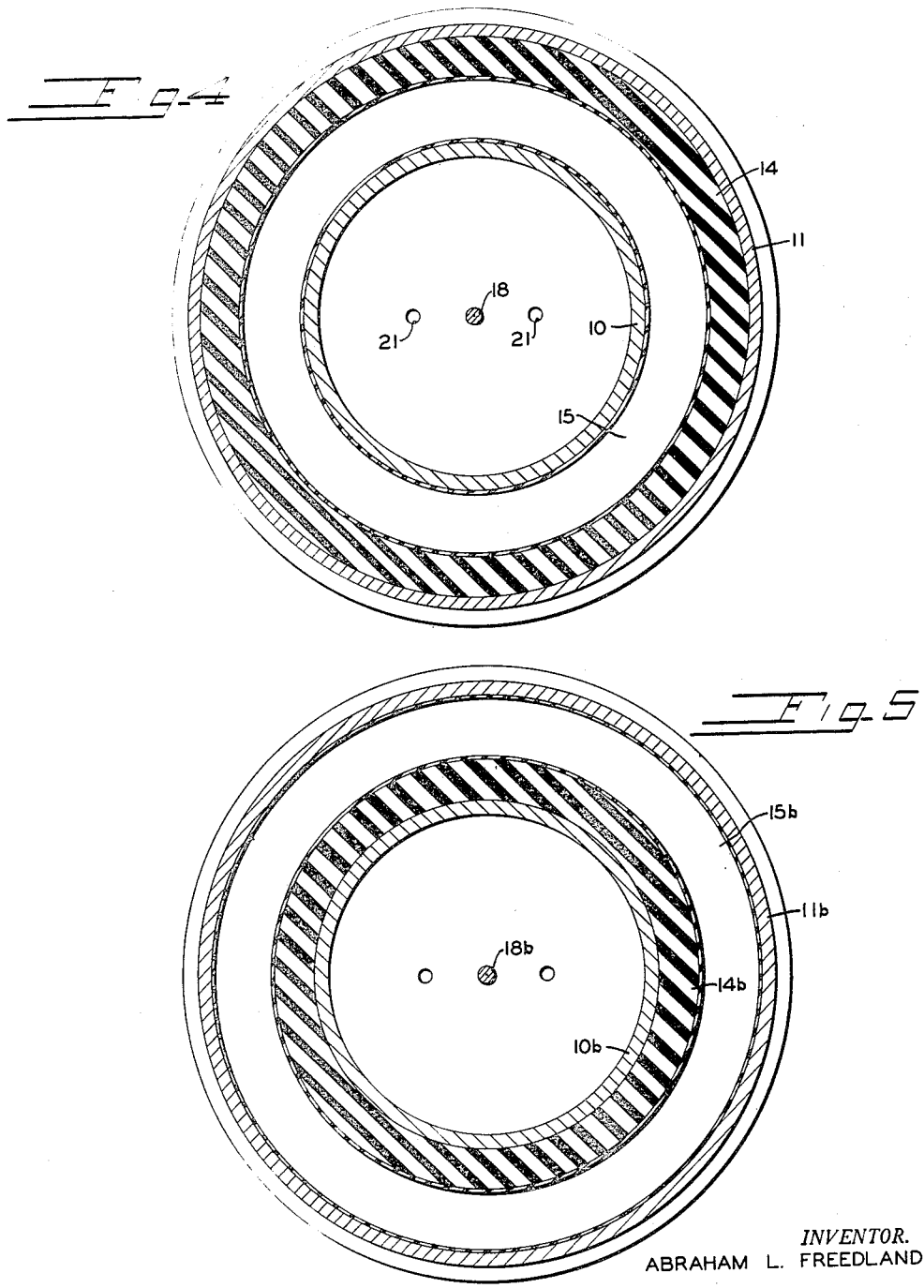
INVENTOR.
ABRAHAM L. FREEDLANDER
BY
HIS ATTORNEY Patented Mar. 9, 1954

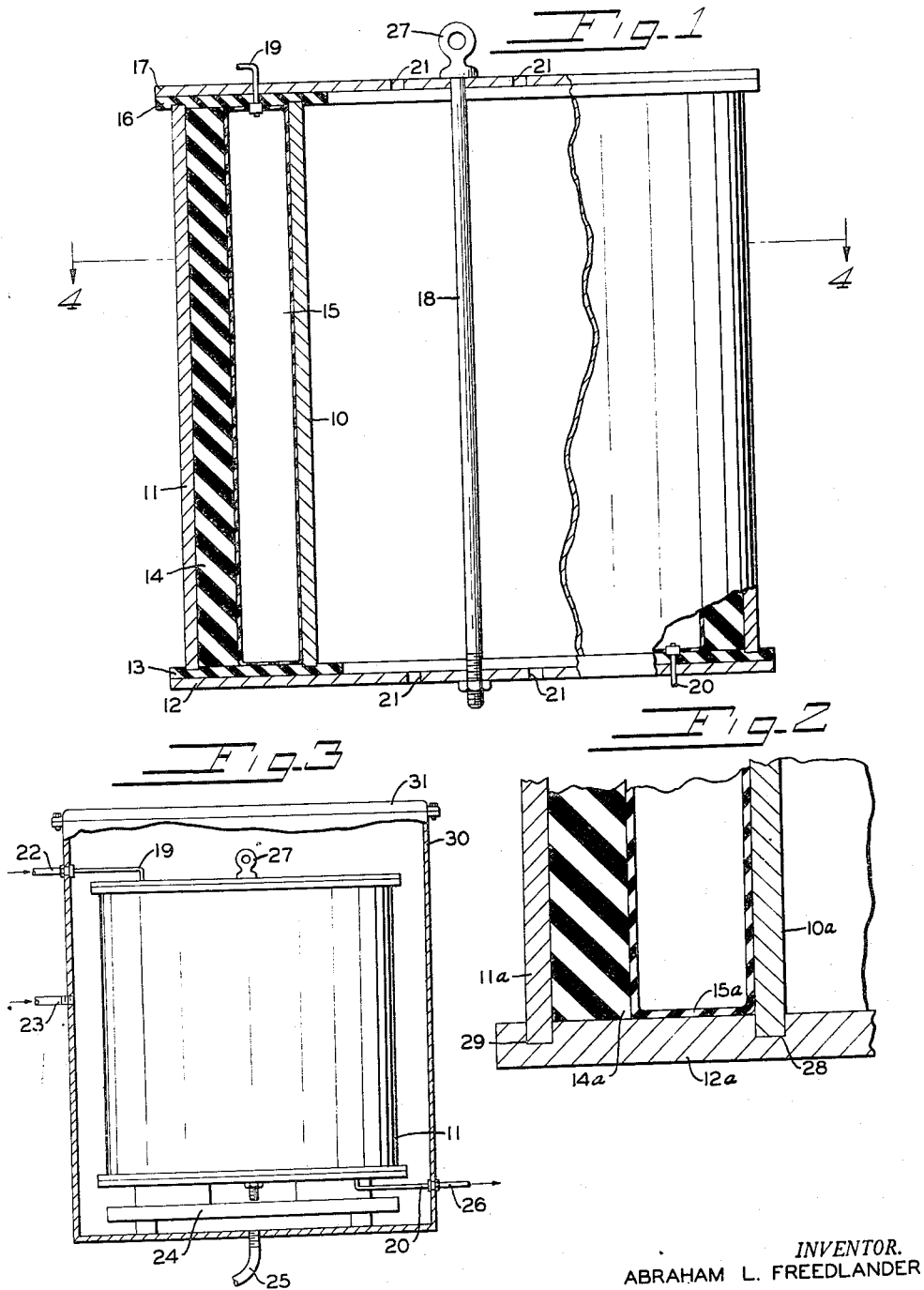

2,671,244

UNITED STATES PATENT OFFICE 2,671,244

APPARATUS FOR THE MANUFACTURE OF BELTS

Abraham L. Freedlander, Dayton, Ohio, assignor to The Dayton Rubber Company, a corporation of Ohio Application June 13, 1949, Serial No. 98,850

6 Claims. (Cl. 18—6)

The present invention relates to a method and apparatus for use in the manufacture of V type belts. It relates further to a method and apparatus for vulcanizing cylindrical rubber belt sleeves from which endless V type belts are obtained.

In one method of manufacturing V type belts which is now utilized, a cylindrical belt sleeve is formed by building up on a drum a plurality of successive layers of fabric and rubber, usually with an intermediate layer of longitudinal cord. The assembly is rag wrapped in order to place the sleeve under compression and then vulcanized in the manner known to the art. The vulcanized sleeve is then removed and cut into a plurality of individual V-shaped continuous belt segments by means of cutting knives. The belts so produced are known as "raw-edged" due to the fact that the sides are not fabric covered. While these belts are generally satisfactory, there are certain disadvantages which may occur resulting from the fact that rag wrapping does not permit the application of a completely uniform pressure throughout the sleeve, with the result that unevenness in curing and dislocation of some of the cords, fabric, or other layers may occur. Furthermore, the rag wrapping weaves a rough top surface on the belt which is undesirable both from the standpoint of appearance and because a non-uniform surface is obtained. The conventional rag wrapping method also requires considerable care and time to be expended by the operator.

It is an object of the present invention to devise a method and apparatus for the vulcanization of a rubber belt sleeve under uniform pressure throughout. It is a further object of the present invention to provide a method and apparatus for the vulcanization of a rubber belt sleeve without dislocation of any of the layers thereof or other structural components. It is an additional object of the present invention to provide a method and apparatus for the manufacture of raw-edged belts having smooth and uniform top surfaces.

In accordance with the present invention a belt sleeve is formed on a drum in the usual way after which it is enclosed at the top, bottom and one side by a rigid member. Compression is then applied to the other side by means of an inflatable or expansible member forcing the belt into engagement with the rigid member at the desired pressure. In this condition the belt sleeve is subjected to vulcanization, preferably by introducing the assembly into a vulcanizing unit. Vulcanizing fluid may also be introduced into the inflatable or expansible member referred to in order to permit the application of vulcanizing temperatures at both sides of the belt sleeve.

For a better understanding of the process and details of this invention reference may be made to the accompanying drawing in which:

Fig. 1 illustrates a view partially in vertical cross section showing a belt sleeve assembled in a vulcanizing unit of the type described.

Fig. 2 illustrates a vertical cross section of a portion of a modified assembly.

Fig. 3 describes a vertical, partial cross section through a portion of a vulcanizing chamber illustrating the unit of the present invention in position therein.

Fig. 4 is a horizontal cross section through the assembly shown in Fig. 1 taken along lines 4—4 of that figure.

Fig. 5 is a cross section similar to that shown in Fig. 4 except with the positions of the belt sleeve and inflatable members reversed.

Referring to Figures 1 and 4, an end plate 12 is laid upon a table or other supporting means. A flexible gasket 13 composed of rubber, cork or similar gasketing material is then placed upon the end plate. The outer shell 11 is next positioned upon the gasket. A belt sleeve 14 which has been formed in the conventional manner on a building drum is removed from the drum and positioned internally of the shell 11 and contiguous therewith as shown. The internal structure of the belt sleeve is not shown and for purposes of illustration only, the sleeve is cross sectioned as if it were all rubber. A hollow cylindrical air bag or similar inflatable member 15 is then inserted into the belt sleeve in the manner indicated in the drawing. The air bag may be partially inflated to facilitate assembly. The inner cylindrical shell 10 is then shoved internally of the air bag and positioned upon the gasket as shown. Gasket 16 is then placed over the top edges of the shell and top end plate 17 is applied thereover. The gaskets are then firmly clamped into engagement with the edges of the shell and the edges of the belt sleeve by means of a long clamping bolt 18 or other clamping means. Air bag 15 has an inlet means 19 which extends through the gasket and the top end plate for the admission of air, steam, hot water or other fluid, and an outlet means 20 extending through gasket 13 and end plate 12 for the eduction of fluid in cases where circulation of the fluid is desired. This outlet may terminate internally of the vulcanizing chamber where the fluid circulated within the air bag is the same as that used for vulcanization as in the case of steam, and where the inflative pressure is the same as that in the vulcanizer.

The end plates 12 and 17 are preferably provided with openings 21 to permit circulation of vulcanizing fluid internally of the inner shell. The metal shells 10 and 11 are made of steel or other rigid alloy and are preferably ¼" to ½" in thickness.

In the modification shown in Fig. 2 the use of gaskets is eliminated by using end plates having spaced concentric channels 28 and 29 formed therein into which the ends of shells 10a and 11a are designed to be inserted. Belt sleeve 14a and air bag 15a are then placed into position in the same manner as described in connection with Fig. 1. A channeled top end plate similar in construction to 12a is then placed in contact with the top edges and the assembly is clamped together as indicated above.

In the practice of the present invention, a cylindrical belt sleeve is formed by building up a plurality of layers in the manner described, for example, by Freedlander Patents 1,591,303 and 1,611,830. The belt sleeve is removed from the building drum and assembled with the shells and air bag in the manner described above. The assembly is then lifted into an autoclave or other vulcanizing chamber as shown in Fig. 3. In this figure the vulcanizing chamber is shown at 30 and the belt sleeve assembly rests on a supporting frame 24 in order to space the bottom of the assembly from the bottom of the chamber.

The inlet 19 to the air bag is then hooked up to line 22 and outlet 20 is hooked up to line 26. Cover 31 is then applied to the chamber and locked into position by bolts or other means which are known to the art. Air, steam, hot water or other inflating fluid is then introduced through lines 22 and 19 and the air bag inflated to the desired point in order to apply pressure against the inner surface of the belt sleeve forcing it against the inner surface of the outer shell. When the desired degree of inflation and pressure has been obtained vulcanizing steam is introduced into the chamber through line 23, and the desired pressure is obtained in the chamber until vulcanizing temperatures are achieved. It is generally preferable to circulate vulcanizing fluid through the air bag in order that vulcanizing temperatures may be applied to the belt sleeve both from the exterior and the interior of the shell. This is accomplished by circulating steam or hot water through the air bag through inlet 19 and outlet 20 while maintaining the desired degree of pressure and inflation of the bag. This is carried out simultaneously with the introduction of steam under pressure in the vulcanizing chamber. At the conclusion of vulcanization lines 22 and 26 are disconnected after shutting off flow of steam and inflating fluid and deflating the air bag. The assembly is then removed from the vulcanizing chamber and the top end plate is removed followed by the removal of the outer shell and belt sleeve. Due to the pressure which has been applied, the belt sleeve will tend to adhere to the shell and it is generally desirable to utilize a waxy material, silicone, talc or other known separation material during the initial assembling in order to insure ready separation at the conclusion of vulcanization. Similar parting material is preferably also applied to the inner surface of the sleeve and the outer surface of the inner shell to avoid adherence of the air bag. The belt sleeve is stripped from the shell and is mounted upon a cutting drum for the formation of individual V-belts which are cut from the sleeve by means of inclined knives in the usual manner.

If desired, the position of the air bag and the belt sleeve in the assembly may be reversed, with the air bag arranged on the outside of the belt sleeve whereby inflation will force the sleeve against the outer surface of the inner shell. In this modification the inner shell may be the building drum upon which the belt was originally formed, in which case the belt sleeve will remain thereon after vulcanization is completed, and the drum may then be mounted in a cutting machine in which the individual belt segments are formed. This form of the invention is illustrated in Fig. 5, which corresponds to Fig. 4 except that the positions of the air bag and the belt sleeve are reversed. In this figure, the inner shell is shown at 10b and the outer shell at 11b. The belt sleeve 14b is positioned between air bag 15b and inner shell 10b. The assembly is clamped together by means of bolt 18b.

A typical procedure for carrying out the method of the present invention and the utilization of the novel form of apparatus described herein is as follows:

A cylindrical building drum having the outer circumference required to give a finished belt of the proper diameter is selected. It is then coated with a solution or suspension of a mold-releasing agent, such as a mixture of powdered mica and soapstone or the like. A single ply of 45° bias-cut base fabric is then applied. This fabric may, for example, be a 14-oz. cotton duck having three plies warp and filler, frictioned on two sides and skim coated on one side with rubber composition. It is laid skim side up and spliced.

A single ply of 0.200 gauge stiflex is then wound around the drum. The stiflex is a rubber composition which may be either natural or synthetic or mixtures thereof having cotton fibers dispersed therein, say 25%. The mixture is then calendered into a sheet with the fibers being arranged primarily extending longitudinally of the sheet and parallel to each other. This ply is laid with the fibers extending parallel to the axis of the sleeve.

A ply of crude rubber cushion stock, for example 0.037 gauge, is then applied to the drum, after which a layer of cord is wound over this ply and around the drum. The cord is preferably 2200 denier 5-ply rayon which has been impregnated with a resorcinol formaldehyde latex dip, as known to the art, for increasing the adhesion to rubber.

Another layer of cushion stock about 0.015 gauge is then applied, after which seven plies of 5-oz. Osnaberg fabric which has been frictioned on both sides with crude rubber stock is wound around the drum.

The assembly of the uncured belt sleeve is now complete and the sleeve is removed from the drum by trimming the edges and applying a stripping collar to one end of the drum. The sleeve is then forced from the drum by applying pressure to the stripping collar. In cases where difficulty is encountered in removing the sleeve from the drum, it is desirable to use a tapered drum having a rubber sleeve which is tapered on the inside but has a smooth cylindrical surface on the outside. After the sleeve has been built, the tapered drum is readily removed and the built-up sleeve can then be readily separated from the cylindrical rubber sleeve upon which it was formed. Where the sleeve is to be vulcanized on the building drum in the form of the invention shown in Fig. 5, this removal step is not required.

The raw belt sleeve is then assembled with the air bag and metal shells in the manner described above, the assembly is placed in an autoclave, and the air bag is inflated, for example, by the introduction of 60 lbs. of steam into the air bag and bleeding off the steam as required from the air bag outlet either to the interior of the autoclave or the exterior thereof. Steam at a pressure of about 60 lbs. and temperature of about 370° F. is then admitted to the autoclave and the sleeve is cured for about one hour. The steam is then shut off and the pressure is released from the autoclave after which the cover is removed and the assembly is taken out of the unit. It is then disassembled and the cured belt sleeve is stripped from its contiguous shell. In order to facilitate stripping and avoid adherence of the air bag to the shell or to the belt sleeve, it is desirable that during initial assembly a mold releasing material, such as soapstone, a silicone solution, or a waxy material, be applied to the surfaces which are to be in contact.

The cured belt sleeve is then placed in a cutting machine where it is cut into a number of endless V-shaped belts by the use of inclined knives in the manner known to the art.

The resulting belts are found to have smooth top and bottom surfaces, and have a very uniform internal structure and alignment of cord and fabric components. In operation the belts run true even at high speeds and were found to have a long life.

The belts are made with either natural or synthetic rubbers or various mixtures or combinations thereof. Synthetic rubber-like materials, such as the butadiene-styrene or butadiene acrylic nitrile copolymers, the polychloroprene rubbers, and other vulcanizable rubber-like materials having resilience and elasticity as are well known to the art, may be used. Suitable fillers, pigments, vulcanizing agents, and accelerators are incorporated in a manner known to those skilled in the art. The cord and fabric components may be of cotton, rayon, nylon, or the like.

The foregoing description must not be considered as limiting the present invention thereto but only as illustrating the embodiment in question, and the scope of the present invention is defined by the appended claims.

I claim:

1. An apparatus for vulcanizing cylindrical rubber belt sleeves under uniform pressure over the entire surface thereby which comprises a pair of spaced concentric rigid cylindrical shells; an inflatable and expansible, hollow cylindrical bag member coextensive with said shells and positioned therebetween contiguous to the wall of one of said shells and spaced from the other of said shells whereby a cylindrical rubber belt sleeve coextensive therewith is adapted to be positioned in said space between said inflatable member and said shell and directly engaged by said inflatable member; means engaging the edges of the cylindrical shells confining said inflatable member and adapted to completely confine the edges of such belt sleeve when positioned in said space; means for expanding said inflatable member whereby such belt sleeve positioned in said space would be forced against a contiguous shell wall and confined under pressure between said wall and the bag member, and the edges of such belt sleeve forced against the said confining means thereby applying uniform pressure throughout the entire sleeve; and means for subjecting the resulting assembly to vulcanizing temperatures to cure the belt sleeve.

2. An apparatus according to claim 1 wherein the confining means comprise resilient gaskets.

3. An apparatus according to claim 1 wherein the confining means comprise channeled members positioned at each end of said shells with the edges of said shells inserted in said channel.

4. An apparatus according to claim 1 wherein the inflatable member includes means for circulating therethrough during vulcanization, fluid at vulcanizing temperature and at a pressure sufficient to effect the desired degree of inflation.

5. An apparatus according to claim 1 wherein the inflatable member is contiguous to the inner shell thereby defining a space between the inflatable member and the outer shell adapted to receive a belt sleeve.

6. An apparatus according to claim 1 wherein the inflatable member is positioned contiguous to the outer shell thereby defining a space between the inflatable member and the inner shell adapted to receive a belt sleeve.

ABRAHAM L. FREEDLANDER.

References Cited in the file of this patent

UNITED STATES PATENTS

| Number | Name | Date |
|---|---|---|
| 890,409 | Cox | June 9, 1908 |
| 1,155,325 | Miller | Sept. 28, 1915 |
| 1,382,326 | Sloper | June 21, 1921 |
| 1,562,548 | Freedlander et al. | Nov. 24, 1925 |
| 1,579,718 | Kuhlke | Apr. 6, 1926 |
| 1,663,979 | Gammeter | Mar. 27, 1928 |
| 1,707,794 | Blaker | Apr. 2, 1929 |
| 1,870,805 | Gammeter | Aug. 9, 1932 |
| 1,871,982 | Geyer | Aug. 16, 1932 |
| 2,253,792 | Leavenworth | Aug. 26, 1941 |